March 14, 1967  O. FOELLNER ET AL  3,308,569
FLASHING FISH LURE
Filed Nov. 20, 1964
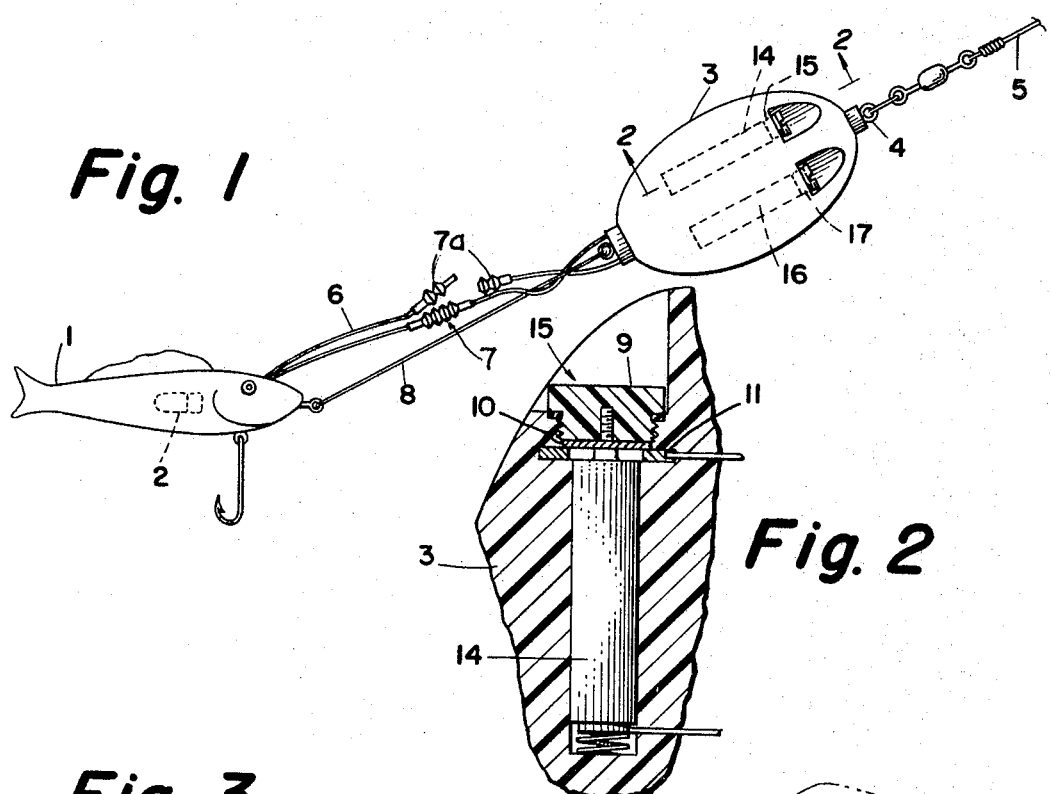
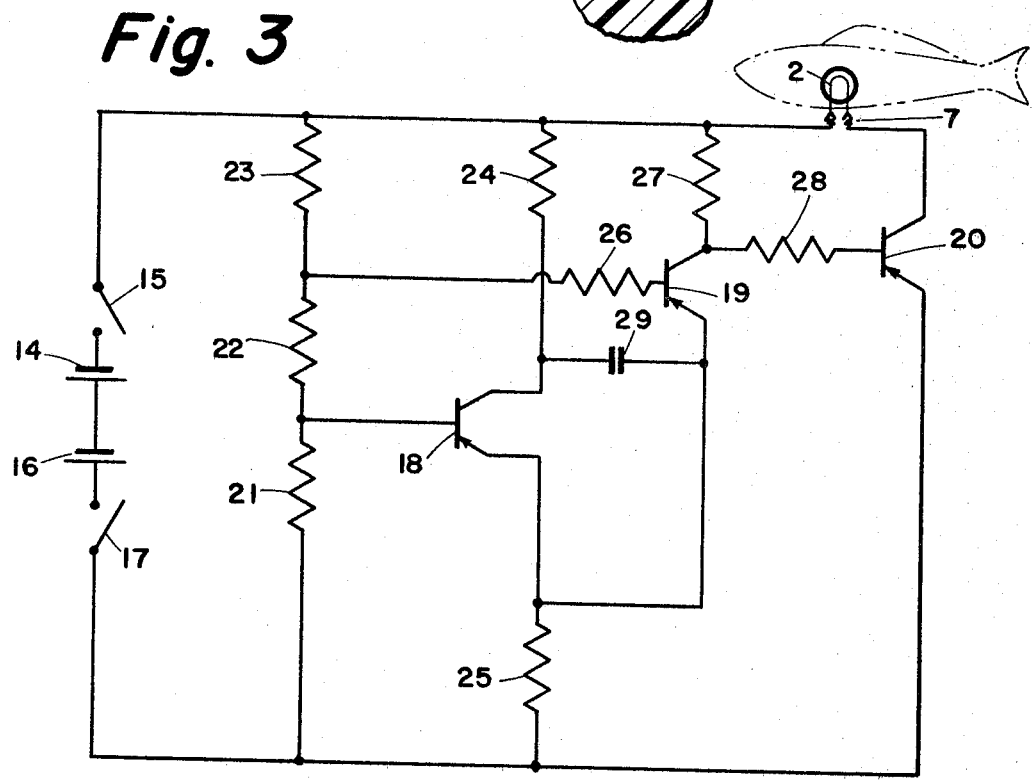

United States Patent Office 3,308,569
Patented Mar. 14, 1967

3,308,569
FLASHING FISH LURE
Oscar Foellner and Donald M. Foellner, both of
201 Swartmore Ave., Folsom, Pa. 19033
Filed Nov. 20, 1964, Ser. No. 412,648
6 Claims. (Cl. 43—17.6)

This invention relates to fish lures and, more particularly, to an improved fish lure of the type which is intermittently illuminated to attract fish.

It has been recognized in the past that fish are attracted to light and, more particularly, may be attracted to a flashing light. Therefore, it is desirable to provide a fish lure which flashes on and off intermittently to attract fish.

Such a flashing fish lure has not been successfully provided in the past. The most difficult problem in such a fish lure is supplying electrical power to the bulb contained in the fish lure to enable it to flash on and off intermittently. The batteries and associated circuitry are too bulky to be contained in the lure itself. Also, it is impractical to have the batteries and circuitry at the surface because of the long electrical connections which would be required and because of the difficulty of handling the connections on a conventional fishing reel.

In accordance with this invention, there is provided a flashing fish lure with the power supply circuitry provided in a container which is separate from the fish lure. This container is waterproof and is sealed in plastic. The technique of sealing the power supply in plastic is commonly referred to as potting the electronic circuitry.

Short connections are provided between this separate power supply and the fish lure. The potted power supply container is of such small size that it can effectively be used as a sinker for the fish lure.

Further, in accordance with this invention, there are provided releasable electrical connections between the potted power supply container and the fish lure. A separate line between the potted power supply and the fish lure is provided so that the power supply connections do not bear any stress when a fish strikes the lure.

Further, in accordance with this invention, there is provided transistorized circuitry which causes the bulb in the lure to flash on and off. This transistorized circuitry is quite compact so that all of the circuitry can be potted in plastic in a small container.

Further objects, advantages and features of this invention will be better understood from the following more detailed description and appended claims taken in conjunction with the drawings in which:

FIG. 1 shows the fish lure and potted power supply connected to a standard fishing rod and lure;

FIG. 2 shows the details of the battery plugs; and

FIG. 3 shows the transistorized circuitry which enables the bulb to flash on and off.

Referring now to FIG. 1, there is shown a lure 1 which is of a translucent plastic material and includes a bulb 2. This bulb may be of the type commonly used in flashlights. The circuitry which causes the bulb to flash on and off, thereby attracting fish, is included in the container 3 which also includes the batteries which supply the power. The flashing circuitry is transistorized and quite small, thereby enabling it to be potted in plastic. Container 3 is completely waterproof and serves as a sinker for the fish lure. The container 3 is fastened by a conventional swivel and eyelet 4 to the fishing line 5 which is wound on the fishing reel, as is normal in all fishing reels. Electrical cable connections 6 extend from the flashing circuitry to the bulb. These connections have releasable waterproof plugs 7, which include rubber sleeves 7a, for disconnecting the bulb from the flashing circuitry. The lure is securely fastened to the container 3 by means of line 8.

When a fish hits the lure, the line 8 bears the load. The electrical cable connections 6 are not placed under stress.

Before proceeding with the description of the electronic circuitry, there will be described the details of the plugs which are inserted into the potted container to secure the batteries in place. These plugs serve the dual function of providing a water tight connection at the openings in which the batteries are inserted and of completing an electrical circuit which initiates the flashing of the fish lure.

Referring to FIG. 2, there is shown an enlarged cross-sectional view along the line 2—2 of FIG. 1. There is provided a plastic plug 9, which may be Teflon or other suitable material, which is threaded for insertion into the container 3. A rubber grommet may be provided to complete the watertight seal. The plastic plug 9 includes an electrically conductive portion 10 at the bottom thereof. Commonly, the electrically conductive portion 10 may be a brass disc. This electrically conductive portion 10 makes contact with a metal contact 11 which is embedded in the plastic container. This metal contact 11 may be a cadmium plated snap ring, for example. When the plug 9 is inserted in the container, it also makes contact with one terminal of the battery. In this manner, a connection is completed between the terminal of the battery and the metal contact 11. If a two-battery supply is provided, a similar plug having an electrically conductive portion which makes contact with another metal contact is provided. These serve similar functions for the other battery.

Referring now to FIG. 3, there is shown the electronic circuitry and batteries which provide the power supply. A battery 14 is connected by way of switch 15 to the flashing circuitry. The switch 15 includes the electrically conductive portion 10 of the plug 9 and the metal contact 11, as previously described in conjunction with FIG. 2. If a two-battery supply is used, a further battery 16 and switch 17 is provided. The switch 17 includes the plastic plug 12 and the metal contact 13. The flashing circuitry includes transistors 18 and 19 connected as an oscillator. As shown, the transistors are connected in a free-running multivibrator circuit. The circuitry further includes an output transistor 20 which supplies power to bulb 2.

Suitable circuit components which may be used in the electronic circuitry shown in FIG. 3 are given in the table below:

Transistor 18 _____ Workman AT30H.
Transistor 19 _____ Workman AT30H.
Transistor 20 _____ Workman AT30H.
Bulb 2 _____ No. 49 bulb.
Resistor 21 _____ 390 ohms.
Resistor 22 _____ 180 ohms.
Resistor 23 _____ 1K ohms.
Resistor 24 _____ 2,200 ohms.
Resistor 25 _____ 470 ohms.
Resistor 26 _____ 13,000 ohms.
Resistor 27 _____ 2,200 ohms.
Resistor 28 _____ 820 ohms.
Capacitor 29 _____ 25 microfarads at 6 working volts.

The operation of the circuit of FIG. 3 is as follows. When switches 15 and 17 are closed, thereby energizing the circuit, the transistor 18 conducts, thereby causing the collector of transistor 18 to go positive. The positive-going voltage is applied through capacitor 29 to the base of transistor 19, thereby turning off transistor 19. As the charge on capacitor 29 decays, the voltage at the base of transistor 19 returns to a more negative level at which transistor conducts. When transistor 19 conducts, the emitter of transistor 19 has a negative-going voltage thereon. This negative-going voltage at the emitter of transistor 19 is applied directly to the emitter of the transistor 18 causing the conduction through transistor 18 to decrease. With the conductivity of transistor 18 decreased, the capacitor 29 will be charged through resistor 24 to a negative value which turns transistor 19 on more fully. As the charge on capacitor 29 decreases through the path including resistor 26 and resistor 23, the base of transistor 19 goes toward a more positive level at which transistor 19 is again turned off. When transistor 19 is turned off, transistor 18 is turned on. The cycle is repeated with the transistors 18 and 19 alternately conducting at a rate determined by the network including resistor 23, resistor 26 and capacitor 29. With the components having values specified previously, the flashing rate will be approximately 1 cycle per second. As transistor 19 is turned on and off alternately, the output transistor 20 is alternately turned on and off. The result is an alternate flow of current through the bulb 2, thereby providing the desired flashing action.

As one possible modification of the invention, the 1½ volts batteries shown in FIG. 3 may be replaced with a 90 volts battery. The advantage of doing this is that the battery would then be usable for at least a whole season, whereas more frequent changing of the 1½ volts batteries may be required. In the event that a 90 volts battery is utilized, the bulb 2 will be replaced with a small neon bulb which ignites at a voltage of approximately 80 volts.

While a particular embodiment of the invention has been shown and described, it will, of course, be understood that various modifications may be made. The appended claims are, therefore, intended to cover any such modifications within the true spirit and scope of the invention.

What is claimed is:

1. A fishing lure comprising:
   a translucent body adapted to carry at least one hook,
   a bulb mounted within said translucent body,
   a watertight container,
   a power supply for supplying intermittent electric current to said bulb, said power supply being enclosed in said watertight container, said power supply including at least one small dry-cell battery,
   a transistor oscillator circuit connected to said battery, the output of said transistor oscillator circuit being connected to said bulb for supplying intermittent current thereto,
   electrical cables between said power supply and said bulb, said electrical cables having releasable watertight connections intermediate the ends of said cables, and
   means on said watertight container for securing a line thereto so that said container may be attached to the line on a conventional fishing reel.

2. A fishing lure comprising:
   a translucent body adapted to carry at least one hook,
   a bulb mounted within said translucent body,
   a watertight container,
   a power supply for supplying intermittent electric current to said bulb, said power supply being enclosed in said watertight container,
   electric cables between said power supply and said bulb, said electrical cables having releasable watertight connections intermediate the ends of said cables, said lure being secured to said container by a stress-bearing line so that said electrical cable connections are not placed under stress, and
   means on said body and on said watertight container for securing a line thereto so that said body and said container may be attached to the line on a conventional fishing reel with said container serving as a weight for said body.

3. The lure recited in claim 2 wherein said power supply includes at least one small dry-cell battery, and a transistor oscillator circuit connected to said battery, the output of said transistor oscillator circuit being connected to said bulb for supplying intermittent current thereto.

4. The lure recited in claim 3 wherein said container includes plastic material which is potted around said battery and said transistor oscillator circuit.

5. The lure recited in claim 4 wherein said container forms an opening for insertion of said battery, and
   a plug for insertion into said opening to provide a watertight seal in said opening, said plug having an electrically conductive portion extending into said opening,
   a metal contact embedded in the opening in said container, and
   electrical connections from said metal contact to said transistor oscillator circuit so that when said plug is inserted in said opening an electrical connection is completed between a terminal of said battery, said electrically conductive portion of said plug, said contact portion and said oscillator circuit.

6. The lure recited in claim 3 wherein said oscillator circuit includes:
   first and second transistors connected as a free-running multivibrator, and
   an output transistor, the collector of the second transistor being connected to the base of said output transistor to periodically turn said output transistor on, said bulb being connected in series circuit with said battery and the collector and emitter of said output transistor so that current is intermittently supplied to said bulb.

References Cited by the Examiner

UNITED STATES PATENTS

| 757,077 | 4/1904 | Whipple | 43—17.6 |
| 1,663,465 | 3/1928 | Neff | 43—17.6 |
| 2,897,623 | 8/1959 | Flournoy | 43—17.6 |
| 3,213,562 | 10/1965 | Salvin et al. | 43—17.5 |

References Cited by the Applicant

UNITED STATES PATENTS

| 2,217,565 | 10/1940 | Seigle et al. |
| 2,649,802 | 8/1953 | Poston. |

SAMUEL KOREN, *Primary Examiner.*

D. J. LEACH, *Assistant Examiner.*